(12) United States Patent
Rhodes et al.

(10) Patent No.: US 10,899,304 B2
(45) Date of Patent: Jan. 26, 2021

(54) KNEE AIRBAG ASSEMBLY

(71) Applicant: Toyoda Gosei Co., Ltd., Aichi (JP)

(72) Inventors: Michael Thomas Rhodes, Sainte Genevieve, MO (US); Sara Anne Schumer, Perryville, MO (US); Peter L. Vigeant, Novi, MI (US); Bradley S. Honermann, Sainte Genevieve, MO (US)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 123 days.

(21) Appl. No.: 16/001,987

(22) Filed: Jun. 7, 2018

(65) Prior Publication Data
US 2019/0351861 A1    Nov. 21, 2019

Related U.S. Application Data

(60) Provisional application No. 62/763,109, filed on May 18, 2018.

(51) Int. Cl.
*B60R 21/2165*  (2011.01)
*B60R 21/217*   (2011.01)
*B60R 21/231*   (2011.01)
*B60R 21/00*    (2006.01)

(52) U.S. Cl.
CPC ...... *B60R 21/2165* (2013.01); *B60R 21/2171* (2013.01); *B60R 21/231* (2013.01); *B60R 2021/0051* (2013.01); *B60R 2021/23169* (2013.01)

(58) Field of Classification Search
CPC ................................................. B60R 21/215
See application file for complete search history.

(56) References Cited

U.S. PATENT DOCUMENTS

| | | | |
|---|---|---|---|
| 5,403,034 A * | 4/1995 | Gans | B60R 21/215 280/728.3 |
| 5,407,223 A * | 4/1995 | Lauritzen | B60R 21/2171 280/728.2 |
| 5,407,226 A * | 4/1995 | Lauritzen | B60R 21/201 280/728.1 |
| 5,431,433 A * | 7/1995 | Steimke | B60R 21/216 280/728.3 |
| 5,520,410 A * | 5/1996 | Sun | B60R 21/215 280/728.3 |

(Continued)

FOREIGN PATENT DOCUMENTS

JP        200016224 A    1/2000

*Primary Examiner* — Nicole T Verley
(74) *Attorney, Agent, or Firm* — Carlson, Gaskey & Olds, P.C.

(57) ABSTRACT

An airbag assembly includes an airbag cover having a first panel portion. The first panel portion has first lower edge and a plurality of clips formed at the first lower edge. The clips each have a thickness greater than the first panel portion. A case has a plurality of openings configured to receive the clips of the airbag cover. The openings in the case may each be an elongated slot including a wide portion and a contiguous narrow portion that is narrower than the thickness of the clip. Each slot is configured such that the clip can be inserted through the wide portion and then slid to the narrow portion to retain the airbag cover to the case.

15 Claims, 7 Drawing Sheets

(56) References Cited

U.S. PATENT DOCUMENTS

| | | | | |
|---|---|---|---|---|
| 5,556,126 | A * | 9/1996 | Lee | B60R 21/215 |
| | | | | 280/728.3 |
| 5,647,608 | A * | 7/1997 | Damman | B60R 21/201 |
| | | | | 280/728.2 |
| 5,718,447 | A * | 2/1998 | Rose | B60R 21/2171 |
| | | | | 280/728.2 |
| 5,722,684 | A * | 3/1998 | Saderholm | B60R 21/2171 |
| | | | | 280/728.3 |
| 5,791,680 | A * | 8/1998 | Dyer | B60R 21/2171 |
| | | | | 280/728.3 |
| 6,209,905 | B1 * | 4/2001 | Preisler | B29C 43/021 |
| | | | | 280/728.2 |
| 7,354,060 | B2 * | 4/2008 | Thomas | B60R 21/21656 |
| | | | | 280/728.3 |
| 7,784,820 | B2 * | 8/2010 | Mazzocchi | B60R 21/215 |
| | | | | 156/73.5 |
| 7,946,620 | B2 * | 5/2011 | Vigeant | B60R 21/2171 |
| | | | | 280/743.1 |
| 8,777,262 | B2 * | 7/2014 | Enders | B60R 21/201 |
| | | | | 280/728.2 |
| 9,376,082 | B2 * | 6/2016 | Osterfeld | B60R 21/201 |
| 9,650,009 | B2 * | 5/2017 | Bana Castro | B60R 21/2155 |
| 10,246,040 | B2 * | 4/2019 | Elija | B60R 21/215 |
| 2006/0170198 | A1 * | 8/2006 | Webber | B60R 21/217 |
| | | | | 280/731 |
| 2007/0278772 | A1 * | 12/2007 | Burghardt | B60R 21/2037 |
| | | | | 280/731 |
| 2008/0012273 | A1 * | 1/2008 | Cowelchuk | B60R 21/2165 |
| | | | | 280/728.3 |
| 2008/0100039 | A1 * | 5/2008 | Schramm | B60R 21/21656 |
| | | | | 280/728.2 |
| 2019/0351859 | A1 * | 11/2019 | Rhodes | B60R 21/206 |

\* cited by examiner

KNEE AIRBAG ASSEMBLY

BACKGROUND

Knee airbags can significantly reduce the occurrence and severity of leg injuries in crashes. Typically, the knee airbag cushion is folded around the inflator. The inflator and cushion are protected and held in place by an airbag cover. The inflator, cushion and cover are secured to a case which is mounted in the vehicle.

SUMMARY

An airbag assembly according to one example embodiment disclosed herein includes an airbag cover having a first panel portion. The first panel portion has first lower edge and a clip formed at the first lower edge. The clip has a thickness greater than the first lower edge of the first panel portion. A case has an opening configured to receive the clip of the airbag cover. The opening has a dimension less than the thickness of the clip to retain the airbag cover to the case.

There may be a plurality of first clips formed along the first lower edge of the first panel portion and a plurality of first openings formed in the case, each configured to receive one of the first clips.

The airbag cover may further include a second panel portion having a second lower edge and a plurality of second clips formed at the second lower edge of the second panel portion. The case would include a plurality of second openings configured to receive the plurality of second clips.

The openings in the case may each be an elongated slot including a wide portion and a contiguous narrow portion. The narrow portion of the slot is narrower than the thickness of the clip. Each slot is configured such that the clip can be inserted through the wide portion and then slid to the narrow portion to retain the airbag cover to the case.

A locking tab may be configured to engage the case and prevent return movement of the clip from the narrow portion of the slot toward the wide portion of the slot.

A tearseam may be formed in the airbag cover by forming a portion of reduced thickness. The tearseam may also include at least one perforation formed in the portion of reduced thickness.

DETAILED DESCRIPTION

Figure 1:
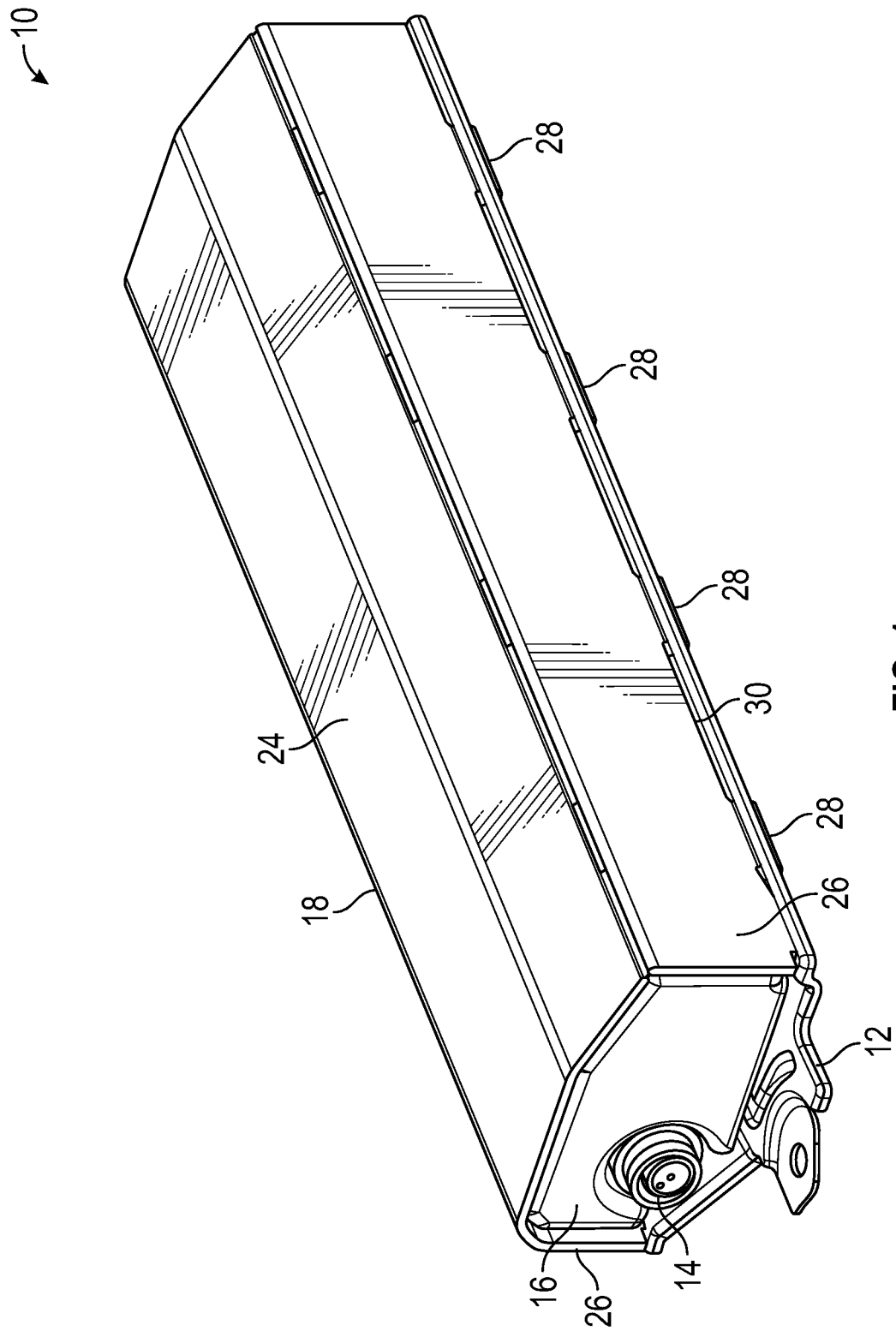
FIG. 1 is a perspective view of a knee airbag assembly according to a first embodiment.

A knee airbag assembly 10 is shown in FIG. 1. The knee airbag assembly 10 includes a case 12 for securing the assembly 10 to the vehicle. An inflator 14 is disposed within a cushion 16, which in turn is wrapped within an airbag cover 18. The airbag cover 18 includes a cover panel portion 24 and a pair of side panel portions 26, which are each connected to the case 12 by a plurality of clips 28. The case 12 may be stamped metal. The cover 18 may be thermoplastic olefin or other suitable material.

Figure 2:
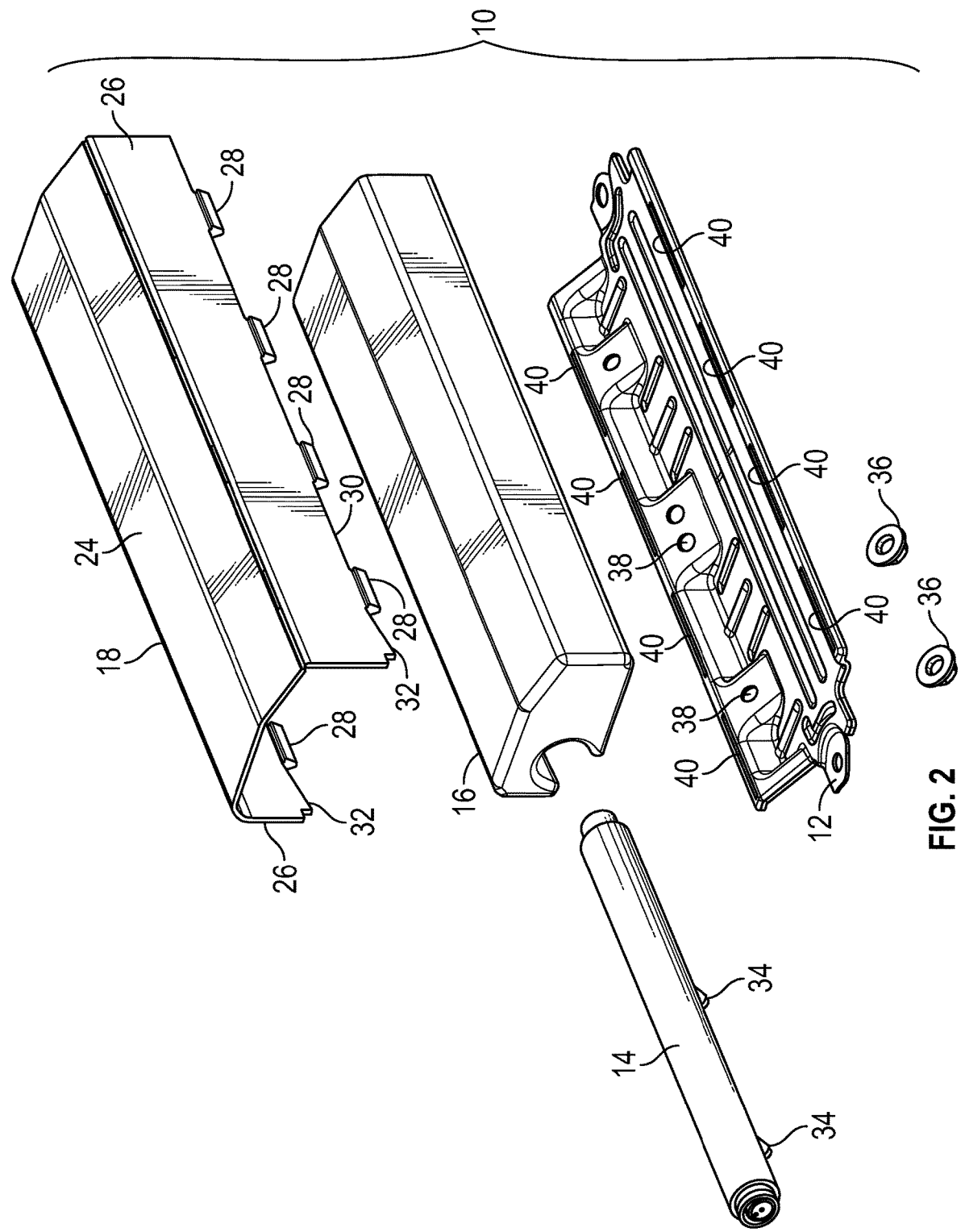
FIG. 2 is an exploded view of the knee airbag assembly of FIG. 1.

FIG. 2 is an exploded view of the airbag assembly 10 of FIG. 1. As shown the side panel portions 26 of the airbag cover 18 each have a lower edge 30. A plurality of clips 28 are formed on each lower edge 30. A locking tab 32 is formed on the lower edges 30 at one end of each of the side panel portions 26. The airbag inflator 14 includes a pair of studs 34 extending radially from the inflator 14. The studs 34 are configured to extend through apertures 38 in the case 12 and to be secured with nuts 36. The case 12 includes a plurality of elongated openings or slots 40 along each of two opposite long edges of the case 12.

Figure 3:
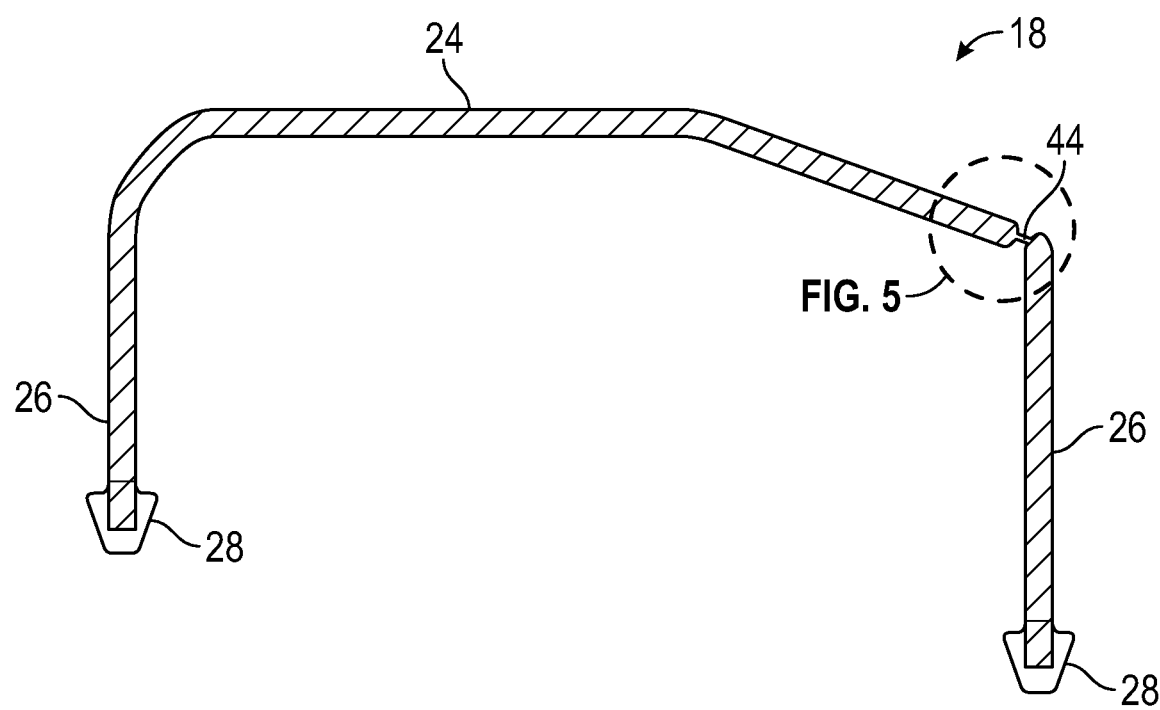
FIG. 3 is a section view of the airbag cover of FIG. 2.

FIG. 3 is a section view through the airbag cover 18. The airbag cover 18 may be extruded as a single piece of plastic. As a result, the airbag cover 18 initially has a constant cross section, which is shown in FIG. 3. The areas between the clips 28 are removed after extrusion. The cover panel portion 24 and the side panel portions 26 are formed integrally with one another. A portion 44 of reduced thickness may be formed at the junction of the cover panel portion 24 and one of the side panel portions 26 to define a tearseam. Alternatively, the portion 44 of reduced thickness could be formed anywhere in the cover panel portion 24 or either of the side panel portions 26.

Figure 4:
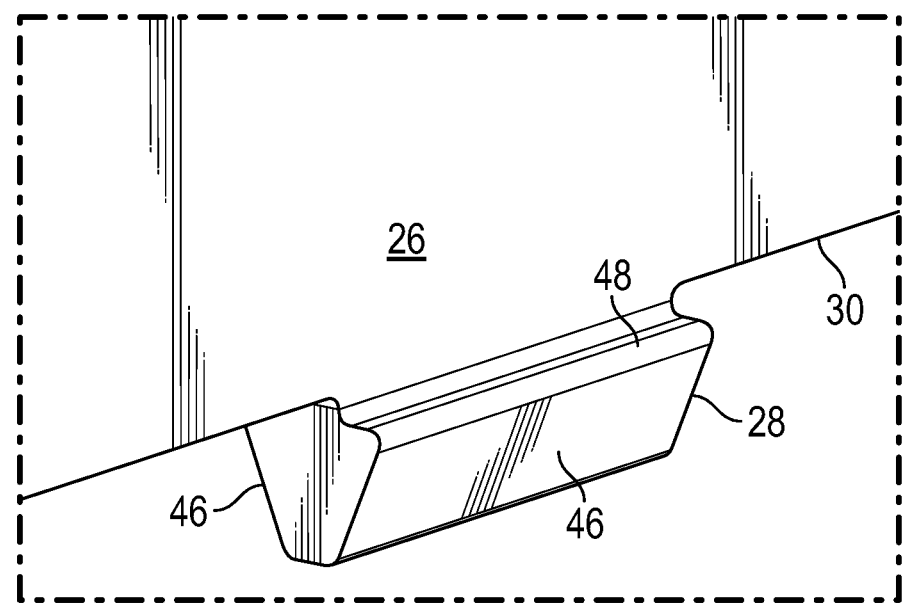
FIG. 4 is an enlarged perspective view of a portion of a cover of FIG. 3.

Referring to FIG. 4, each of the clips 28 has a thickness significantly greater than the thickness of the side panel portion 26. Each clip 28 protrudes downward from the lower edge 30 of the side panel portion 26 and is wider than the thickness of the side panel portion 26 to form a pair of shoulders 48, one on either side of the side panel portion 26. Opposite tapered side surfaces 46 of the clip 28 taper down from the shoulders 48 to a lowermost end.

Figure 5:
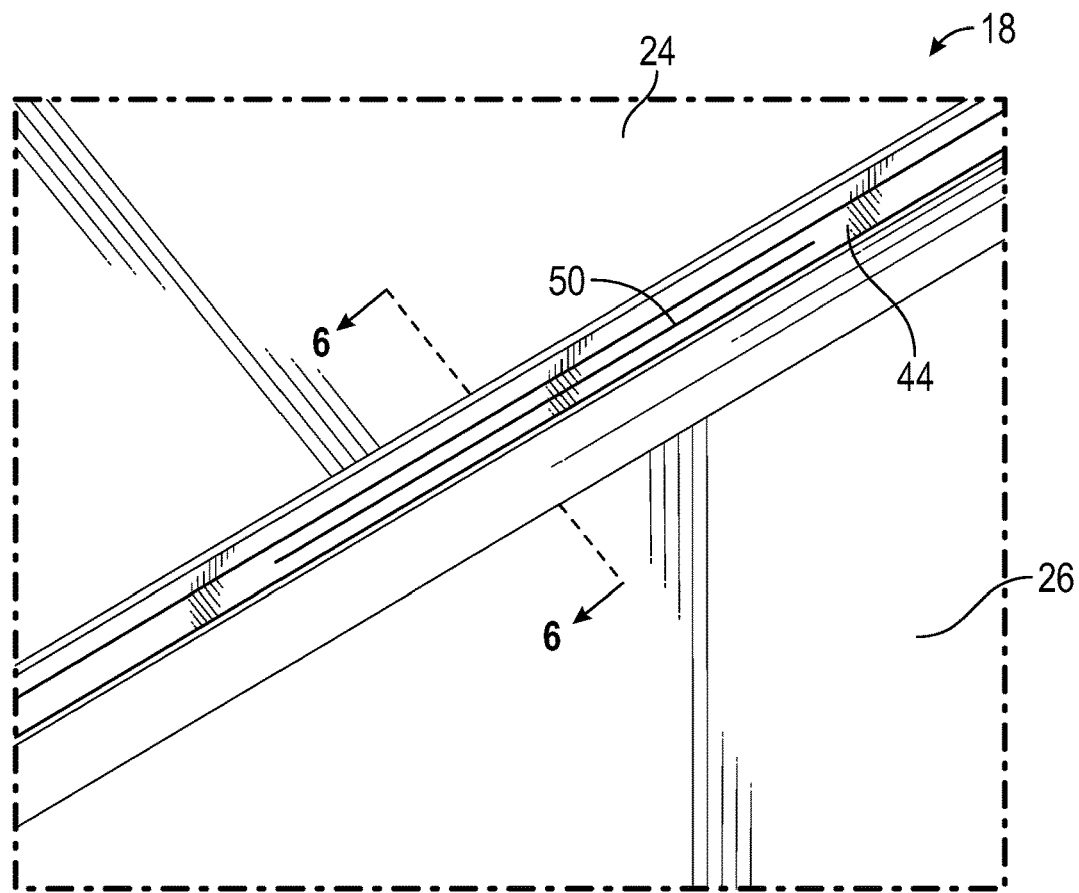
FIG. 5 is an enlarged perspective view of the portion of the airbag cover of FIG. 3.
Figure 6:
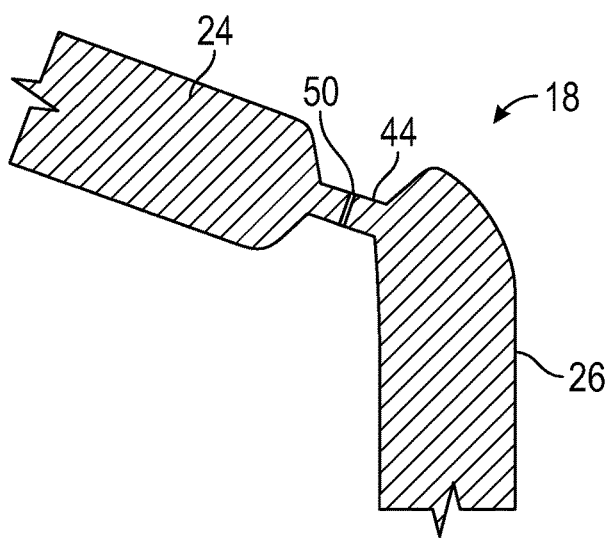
FIG. 6 is a section view taken along line 6-6 of FIG. 5.

FIG. 5 is an enlarged view of the portion 44 of reduced thickness of FIG. 3. FIG. 6 is a section view taken along line 6-6 of FIG. 5. Referring to FIGS. 5 and 6, the portion 44 of reduced thickness (i.e. reduced thickness relative to the cover panel portion 24 and the side panel portion 26) may further include one or more narrow knife slits or perforations 50. In this way, the portion 44 of reduced thickness provides a tearseam, and the cover 18 retention can be easily tuned by adjusting the number, size, spacing of the perforations 50 and the thickness of the portion 44 of reduced thickness.

Figure 7:
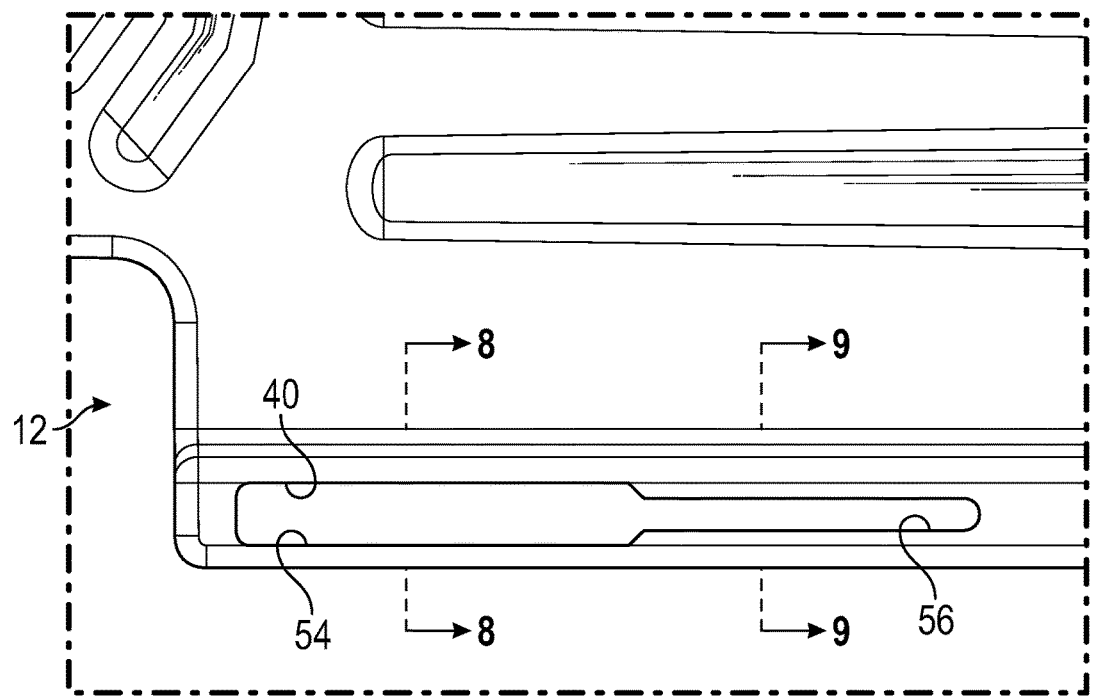
FIG. 7 is an enlarged view of a portion of the case of FIG. 1.

FIG. 7 is an enlarged top view of a portion of the case of FIG. 1, showing one of the elongated slots 40. Each slot 40 includes a wide portion 54 contiguous with a narrow portion 56.

Figure 8:
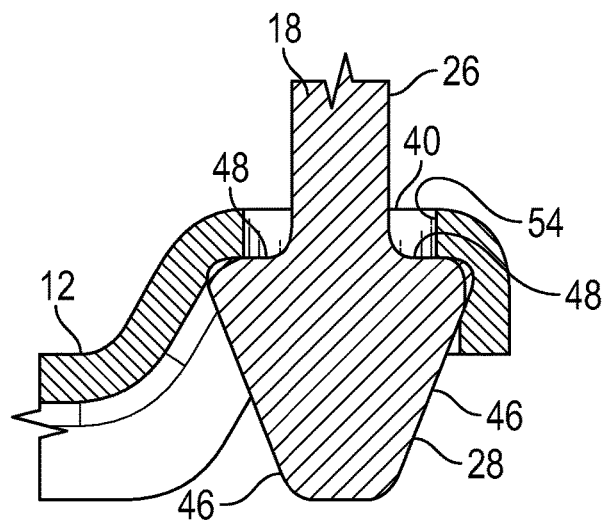
FIG. 8 is a section view taken along line 8-8 of FIG. 7, with the clip of the airbag cover inserted therein.
Figure 9:
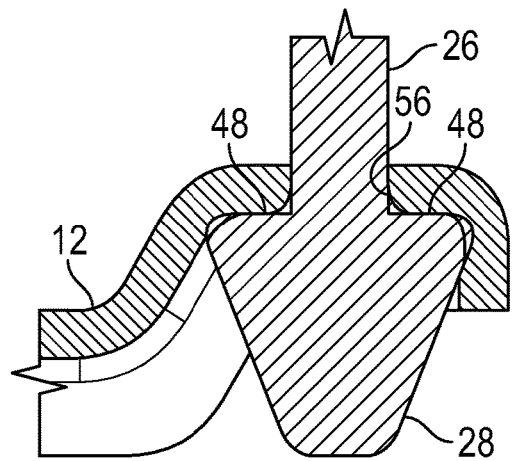
FIG. 9 is a section view taken along line 9-9 of FIG. 7, with the clip of the airbag cover slid to that position.

FIG. 8 is a section view taken along line 8-8 of FIG. 7, with the clip 28 of the airbag cover 18 inserted into the wide portion 54 of the slot 40. The clip 28 can be snap-fit through the wide portion 54 of the slot 40. The shoulders 48 of the clip 28 then retain the clip 28 below the slot 40. All of the clips 28 would be inserted into the wide portions 54 of the corresponding slots 40. The airbag cover 18 is then slid relative to the case 12 so that the clips 28 move to the narrow portions 56 of the slots 40, as shown in FIG. 9. In this position, the shoulders 48 of the clips 28 more securely retain the airbag cover 18 to the case 12. The narrow portions 56 of the slots 40 are approximately the same width as the width of the side panel portions 26 above the clips 28.

Figure 10:
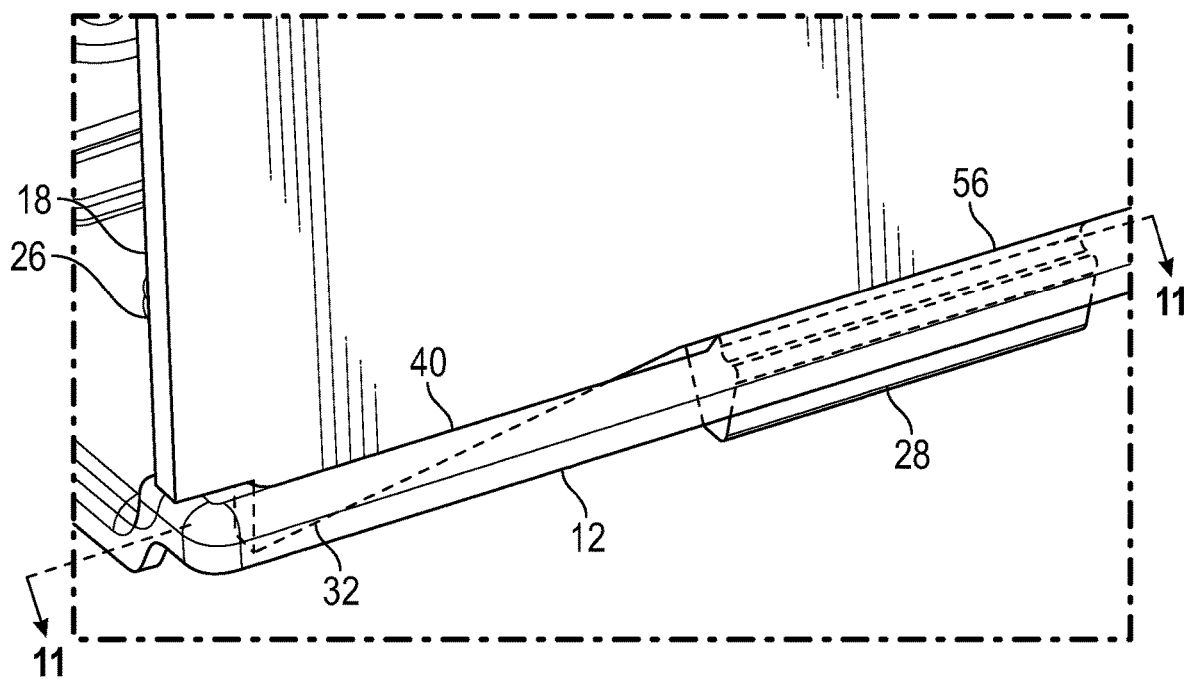
FIG. 10 is an enlarged perspective view of a portion of the airbag cover connected to the case.

As can be seen in FIG. 10, when the clips 28 are moved to the narrow portions 56 of the slots 40, the tab 32 on each side panel portion 18 (one shown) snaps into the wide portion 54 of the end slots 40. This retains the clips 28 in the narrow portions 56 of the slots 40, which in turn retains the airbag cover 18 to the case 12.

Figure 11:
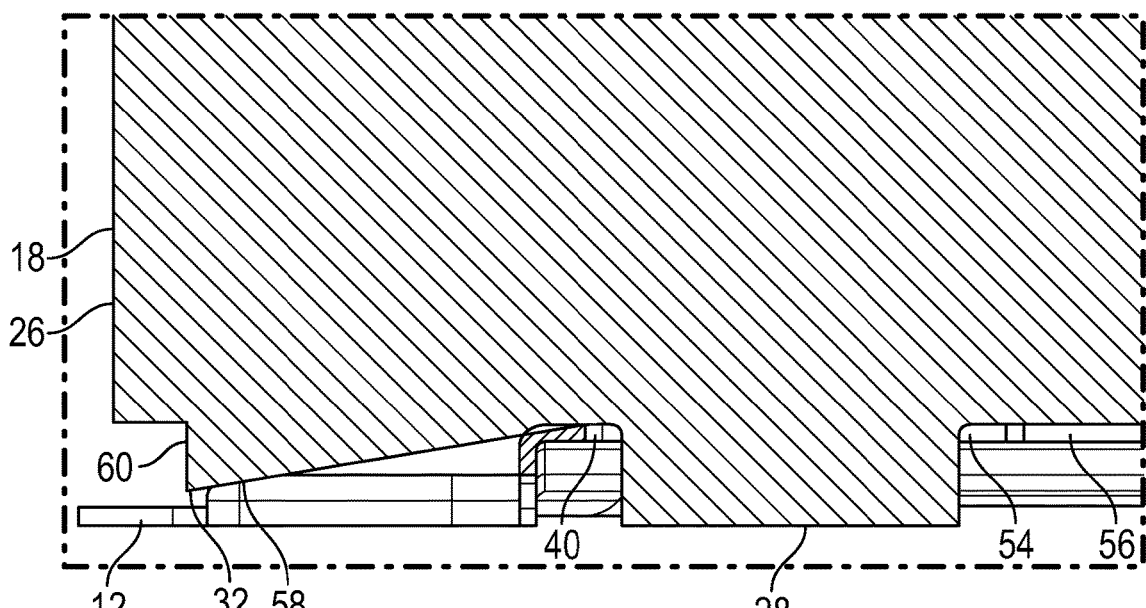
FIG. 11 is a section view taken along line 11-11 of FIG. 10 but with the clip in the wide portion of the slot.
Figure 12:
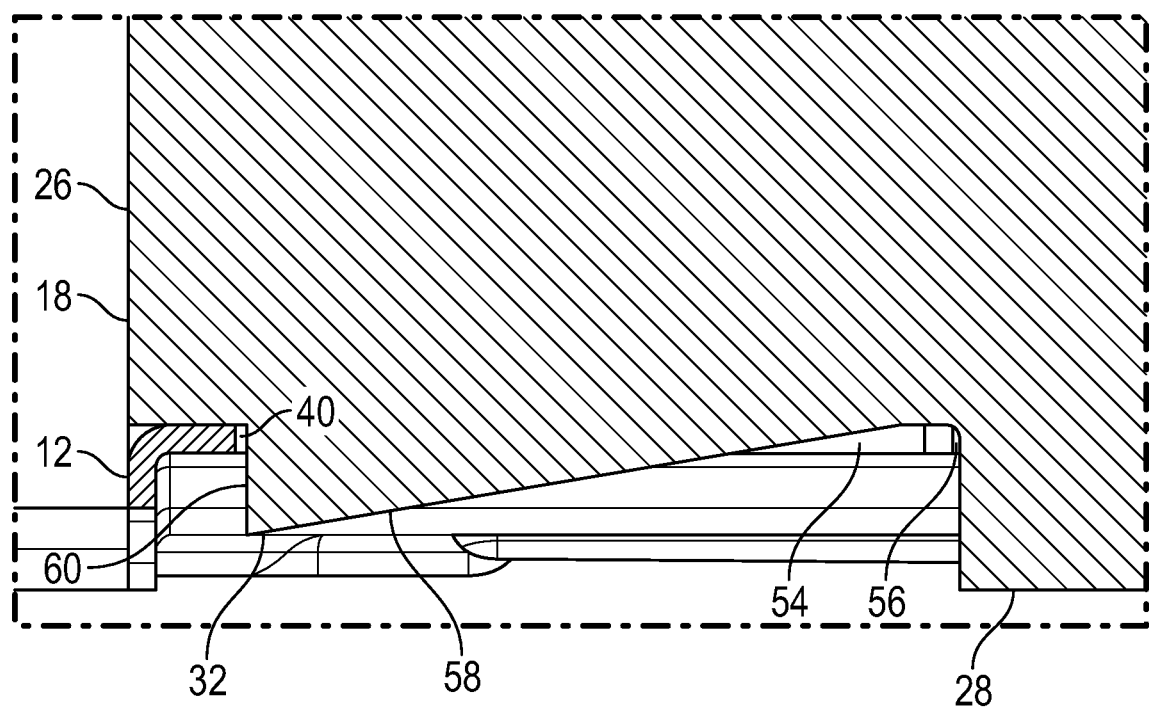
FIG. 12 is a view similar to FIG. 11, but with the clip slid to the narrow portion of the slot.

FIG. 11 is a section view taken along line 11-11 of FIG. 10 but with the clip 28 still in the wide portion 54 of the slot 40. When the clip 28 is first snapped into the wide portion 54 of the slot 40, the tab 32 is positioned outside of the case 12. A ramp portion 58 of the lower edge 30 of each side panel portion 26 leads to the tab 32, which has a shoulder portion 60 at the end. As the airbag cover 18 is slid relative to the case 12 (to the right in FIG. 11), the ramp portion 58 engages the case 12 and raises the side panel portion 26, which elastically deforms slightly because the clip 28 is already trapped in the slot 40. As shown in FIG. 12, when the tab 32 gets to the slot 40, the tab 32 snaps into the slot 40. The shoulder 60 of the tab 32 abuts the edge of the slot 40 to inhibit movement of the side panel portion 26 in a direction that would return the clips 28 from the narrow portion 56 to the wide portion 54 of the slot 40.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, the example airbag assembly is a knee airbag assembly, but the inventive features described herein could also be used in other airbag assemblies, such as a side airbag, passenger airbag, etc. Further, although there are cost benefits to extruding the airbag cover, the airbag cover could also be injection molded, thermoformed, or formed from some other method. Alphanumeric identifiers on method steps are for ease of reference in dependent claims and do not signify a required sequence of performance of the method steps unless otherwise indicated specifically in the claim.

What is claimed is:

1. An airbag assembly comprising:
   an airbag cover having a first panel portion integrally formed with a cover panel portion, wherein the cover panel portion is transverse to the first panel portion, and wherein a tearseam is formed at a junction between the first panel portion and the cover panel portion, the first panel portion having a first lower edge, a clip formed at the first lower edge of the first panel portion, the clip having a thickness greater than the first lower edge of the first panel portion; and
   a case having an opening configured to receive the clip of the airbag cover, the opening having a dimension less than the thickness of the clip.

2. The airbag assembly of claim 1 wherein the clip is one of a plurality of first clips formed along the first lower edge of the first panel portion, and wherein the opening is one of a plurality of first openings formed in the case, each configured to receive one of the first clips.

3. The airbag assembly of claim 2 wherein the airbag cover further includes a second panel portion having a second lower edge and a plurality of second clips formed at the second lower edge of the second panel portion, the case including a plurality of second openings configured to receive the plurality of second clips.

4. The airbag assembly of claim 1 wherein the opening is an elongated slot including a wide portion and a contiguous narrow portion, wherein the narrow portion of the slot is narrower than the wide portion, wherein the narrow portion is narrower than the thickness of the clip, wherein the slot is configured such that the clip can be inserted through the wide portion and then slid to the narrow portion to retain the airbag cover to the case.

5. The airbag assembly of claim 4 wherein the first lower edge of the first panel portion further includes a locking tab configured to engage the case and prevent movement of the clip from the narrow portion of the slot toward the wide portion of the slot.

6. The airbag assembly of claim 4 wherein the clip is one of a plurality of first clips formed along the first lower edge of the first panel portion, and wherein the slot is one of a plurality of first slots formed in the case, each of the plurality of first slots including a wide portion and a contiguous narrow portion narrower than the thickness of a corresponding one of the plurality of first clips and narrower than the wide portion, and wherein the wide portions of the plurality of first slots are configured to receive the plurality of first clips such that the airbag cover can be slid relative to the case to slide the plurality of first clips into the narrow portions of the plurality of first slots to retain the airbag cover to the case.

7. The airbag assembly of claim 6 wherein the airbag cover further includes a second panel portion having a second lower edge and a plurality of second clips formed at the second lower edge of the second panel portion, the case further including a plurality of second slots each having a wide portion and a contiguous narrow portion, the plurality of second slots are configured to receive the plurality of second clips such that the airbag cover can be slid relative to the case to slide the plurality of second clips into the narrow portions of the plurality of second slots to retain the airbag cover to the case.

8. The airbag assembly of claim 7 wherein the tearseam includes a portion of reduced thickness.

9. The airbag assembly of claim 8 wherein the tearseam further include at least one perforation formed in the portion of reduced thickness.

10. The airbag assembly of claim 9 wherein the airbag cover is extruded as a single piece of plastic, including the first panel portion, the plurality of first clips, the plurality of second clips and the portion of reduced thickness.

11. The airbag assembly of claim 9 further including a cushion between the airbag cover and the case.

12. The airbag assembly of claim 11 further including an inflator in the cushion.

13. The airbag assembly of claim 1 wherein the airbag cover further includes a second panel portion integrally formed with the first panel portion and the cover panel portion, wherein the second panel portion has a second lower edge and a plurality of second clips formed at the second lower edge of the second panel portion, the case including a plurality of second openings configured to receive the plurality of second clips.

14. The airbag assembly of claim 1 wherein the first panel portion is transverse to a portion of the case in which the opening of the case is formed.

15. The airbag assembly of claim 1 wherein the first panel portion extends in a first direction down to the first lower edge and wherein the clip projects in the first direction from the first lower edge.

* * * * *